United States Patent [19]
Eisenstadt

[11] 3,860,732
[45] Jan. 14, 1975

[54] SALT SUBSTITUTE

[75] Inventor: Benjamin Eisenstadt, Brooklyn, N.Y.

[73] Assignee: Cumberland Packing Corp., Brooklyn, N.Y.

[22] Filed: Mar. 30, 1970

[21] Appl. No.: 23,986

[52] U.S. Cl. ............................................. 426/219
[51] Int. Cl. ............................................ A23l 1/22
[58] Field of Search ...................... 99/143; 426/219

[56] References Cited
UNITED STATES PATENTS
| | | | |
|---|---|---|---|
| 1,998,179 | 4/1935 | Wolf | 99/143 |
| 2,742,366 | 4/1956 | Power | 99/143 |
| 3,505,082 | 4/1970 | Miller | 99/143 |

FOREIGN PATENTS OR APPLICATIONS
| | | | |
|---|---|---|---|
| 421,554 | 12/1934 | Great Britain | 99/143 |

*Primary Examiner*—David M. Naff
*Attorney, Agent, or Firm*—Steinberg & Blake

[57] ABSTRACT

This invention relates to sodium-free salt substitutes which avoid the bitter aftertaste of known sodium-free salt substitutes. The compositions of the invention comprise potassium chloride alone or potassium chloride plus ammonium chloride mixed with lactose and/or dextrose and cream of tartar.

7 Claims, No Drawings

SALT SUBSTITUTE

BACKGROUND OF THE INVENTION

It is well known that persons with high blood pressure, tendency to edema, heart trouble, etc. are often advised by their physicians to reduce their salt intake. What the physician actually means by this is that the individual should not use common salt or sodium chloride because of the effect of sodium on the blood pressure.

It is also well known that foods prepared without common salt have a flat, undesirable taste. Therefore, persons on sodium-free diets or on so-called salt-free diets generally use salt substitutes such as potassium chloride, ammonium chloride, and mixtures thereof. Sometimes glutamic acid is used in such mixtures and sometimes sodium glutamate is used as a salt substitute either alone or in combination with potassium chloride and/or ammonium chloride. However, all of the known salt substitutes suffer from the disadvantage that they are highly bitter, and in fact, the bitterness is generally so strong as to overcome the salty taste, and the overall taste is less than desirable. In fact, the taste of known salt substitutes is in general so bad that physicians have a great deal of trouble in keeping their patients on sodium-free diets.

SUMMARY OF THE INVENTION

Generally speaking, the present invention mainly comprises sodium-free salt substitute comprising potassium chloride alone or potassium chloride plus ammonium chloride, in admixture with lactose alone or dextrose alone or lactose plus dextrose and cream of tartar, which is of course also known as potassium bitartrate.

It is accordingly a primary object of the present invention to provide sodium-free substitutes which have a salty taste and which are substantially free of any bitter taste.

It is another object of the present invention to provide sodium-free salt compositions which can be sprinkled on food like common salt to achieve a desirable salty taste without undesirable bitter direct taste or bitter aftertaste.

Other objects and advantages of the present invention will be apparent from a further reading of the specification and of the appended claims.

It has been found that while lactose alone, or dextrose alone or lactose plus dextrose has a fairly good effect in blocking out the bitter taste of the potassium chloride and/or ammonium chloride, with a minimum of undesirably affecting the salty taste thereof, a truly noticeable salty taste is only achieved by adding cream of tartar (potassium bitartrate) to the mixture. It must be noted that the use of cream of tartar alone, that is with the potassium chloride and/or ammonium chloride, is not sufficient to block out the bitter taste of the product.

Relatively small amounts of lactose and/or dextrose and cream of tartar are sufficient to have a pronounced effect in improving the taste of the sodium free salt composition. Although relatively larger amounts can be used if too great an amount is used there will not be any further improvement in the flavor, and as a matter of fact some of the saltiness of the flavor is removed by the use of too great amounts of lactose and/or dextrose and cream of tartar.

Most of the commonly available sodium free salt compositions use mixtures of potassium chloride and ammonium chloride. Such mixture can be used according to the present invention. However, it is a considerable advantage of the present invention that it is possible to use potassium chloride alone rather than a mixture of potassium chloride and ammonium chloride, because the combination of lactose and cream of tartar is sufficient to overcome the bitter taste of potassium chloride with ammonium chloride. The avoiding of the use of ammonium chloride actually further improves the taste of the salt substitute composition of the present invention.

The amount of lactose and/or dextrose in the composition of the present invention is preferably between about one-tenth and one-third of the amount of the sodium-free salt substitute (potassium chloride alone or potassium chloride plus ammonium chloride), by weight. Most preferably the amount of the lactose and/or dextrose is between about one-sixth and one-fourth the amount of the potassium chloride or potassium chloride plus ammonium chloride.

Only very small amounts of cream of tartar are needed in the composition, though it has been found that these amounts are necessary in order to obtain a true depression of the bitter taste without adversely affecting the salty taste of the composition. The amount of cream of tartar is preferably about 1/500th – 1/100th of the sodium-free salt substitute (potassium chloride or potassium chloride plus ammonium chloride), and most preferably about 1/300th – 1/200th of the amount thereof, by weight.

It should be noted that lactose and/or dextrose have been found to be suitable with potassium bitartrate for the purposes of the present invention to block out the bitter taste of the sodium-free salt substitutes without undesirably affecting the salty taste of the composition which is not surprising in view of the fact that these substances are chemically sugars. However, they must be used with potassium bitartrate in order to obtain a good saltiness along with the blocking out of the bitter taste of the potassium chloride or the potassium chloride plus ammonium chloride.

Although it is preferred according to the present invention to use potassium chloride alone as the sodium-free salt substitute, it is also possible to use a mixture of potassium chloride and ammonium chloride, in which case it is preferred that the amount of potassium chloride be about 10 – 30 times the amount of the ammonium chloride, by weight.

DESCRIPTION OF PREFERRED EMBODIMENTS

The following examples are given to further illustrate the present invention. The scope of the invention is not, however, meant to be limited to the specific details of the examples.

EXAMPLE 1

250 lbs of potassium chloride, 50 lbs. of lactose and one lb. of cream of tartar are thoroughly mixed to provide a uniform mixture.

The resulting mixture can be used in place of common salt by persons who are required to restrict their sodium intake. This composition can be shaken like common salt and will give a relatively good approximation of the salty taste of common salt without any substantial bitter taste which normally occurs with sodium-free salt substitutes.

EXAMPLE 2

A sodium-free salt composition is prepared as in Example 1, using 275 lbs. of potassium chloride, 25 lbs. of ammonium chloride, and 100 lbs. of lactose and 3 lbs. of cream of tartar.

EXAMPLE 3

A sodium-free salt composition is prepared as in Example 1, using 300 lbs. of potassium chloride, 30 lbs. of lactose and ¾ lb. of potassium bitartrate.

EXAMPLE 4

A sodium-free salt composition is prepared as in Example 1, however using dextrose instead of lactose.

EXAMPLE 5

A sodium-free salt composition is prepared as in Example 2, however using 75 lbs. of lactose and 25 lbs. of dextrose.

EXAMPLE 6

A sodium-free salt composition is prepared as in Example 2, however using 75 lbs. of dextrose and 25 lbs. of lactose.

EXAMPLE 7

A sodium-free salt composition is prepared as in Example 2, however using 50 lbs. of lactose and 50 lbs. of dextrose.

The basis of the present invention is fully revealed from the above discussion and modifications and adaptations therefor are and should be considered as falling within the meaning and range of equivalence of the following claims:

What is claimed is:

1. A sodium-free salt substitute, consisting essentially of a sodium-free salt selected from the group consisting of potassium chloride and a mixture of potassium chloride and ammonium chloride, at least one substance selected from the group consisting of lactose and dextrose in an amount of about one-tenth and one-third the amount of said sodium free salt by weight, and cream of tartar in an amount of about one five-hundredth and one one-hundredth the amount of said sodium free salt by weight.

2. Composition according to claim 1 wherein said sodium-free salt is potassium chloride.

3. Composition according to claim 1 wherein the amount of said substance is between about one-sixth and one-fourth the amount of said sodium-free salt, and the amount of cream of tartar is between about one three-hundredth and one two-hundredth the amount of said sodium-free salt, all amounts being by weight.

4. Composition according to claim 3 wherein said sodium-free salt is potassium chloride.

5. Composition according to claim 1 wherein said substance is dextrose.

6. Composition according to claim 1 wherein said substance is a mixture of lactose and dextrose.

7. Composition according to claim 4 wherein said substance is dextrose.

* * * * *